Patented Mar. 17, 1925.

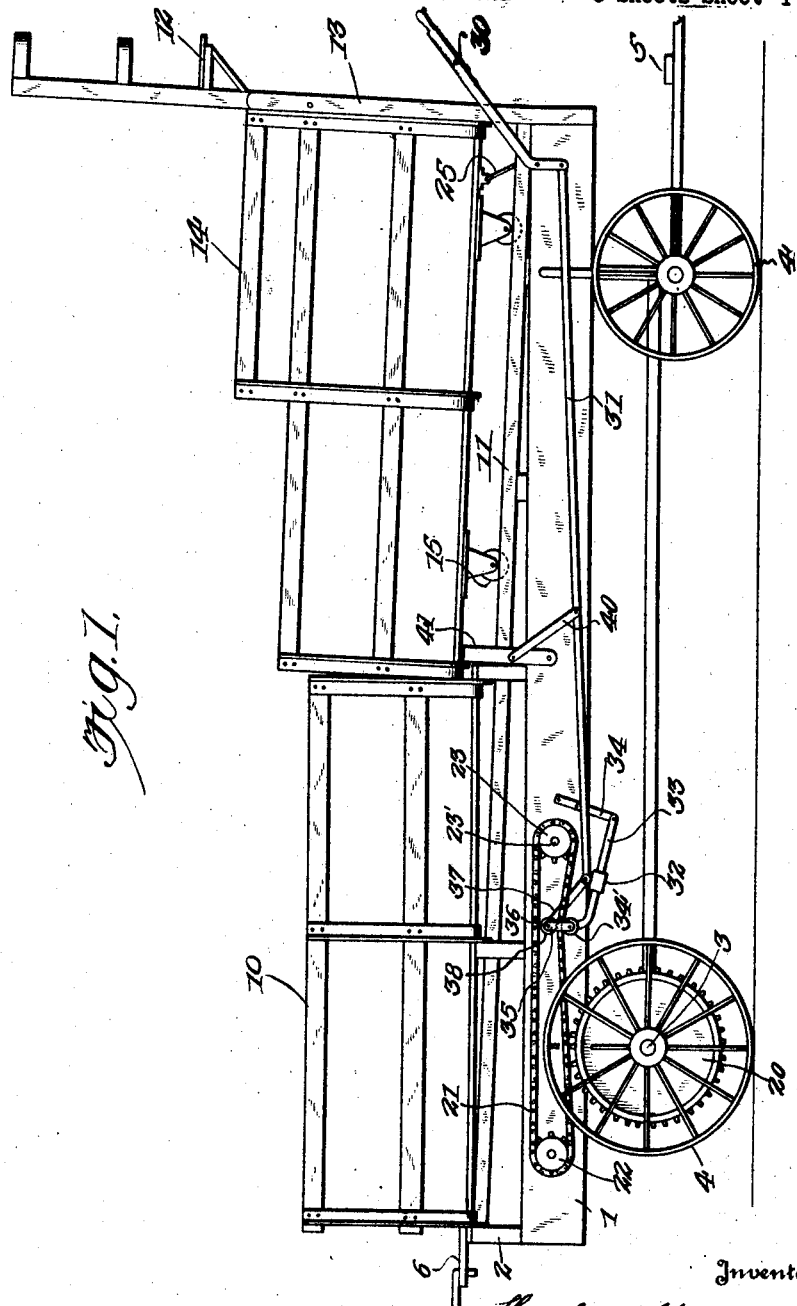

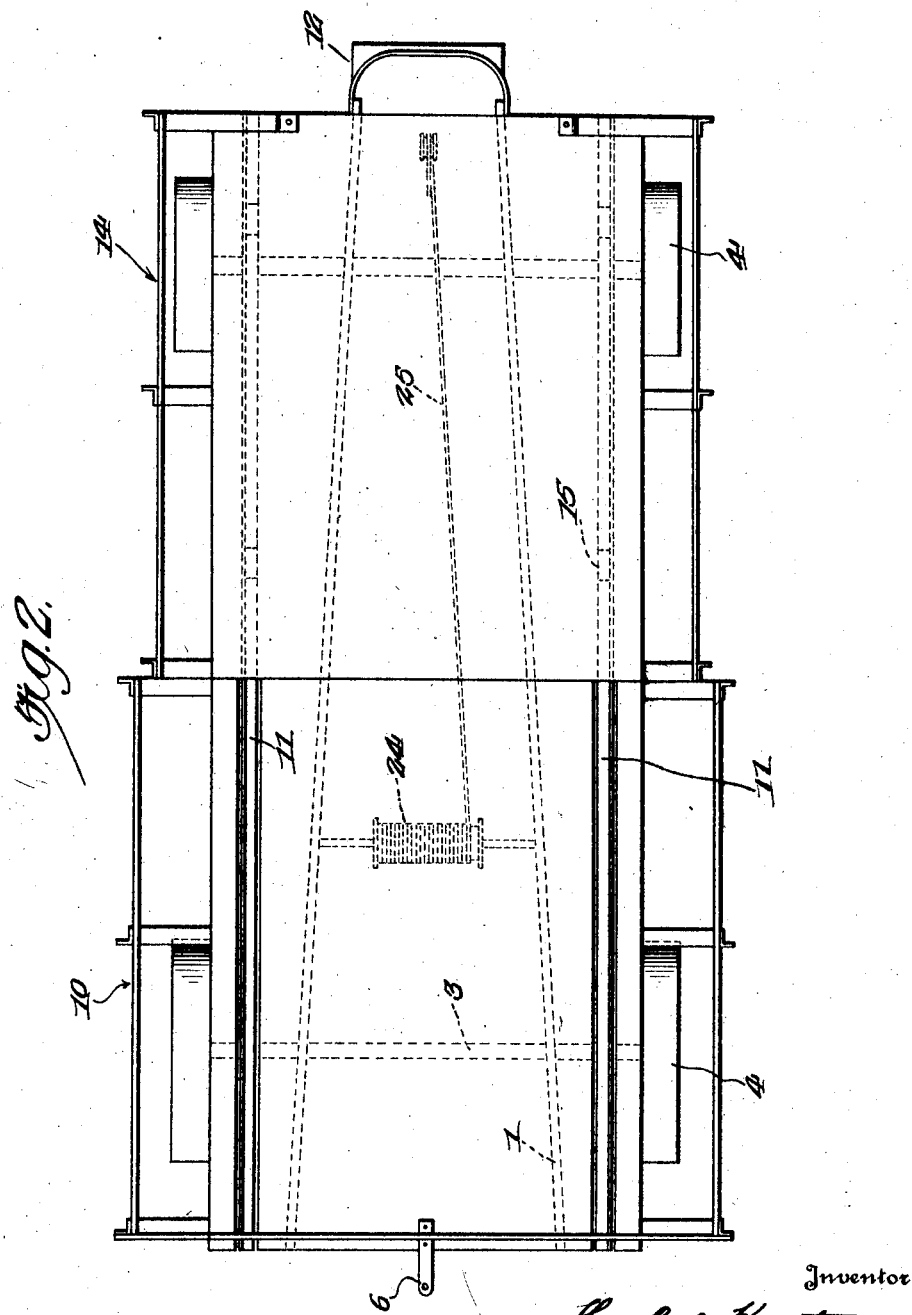

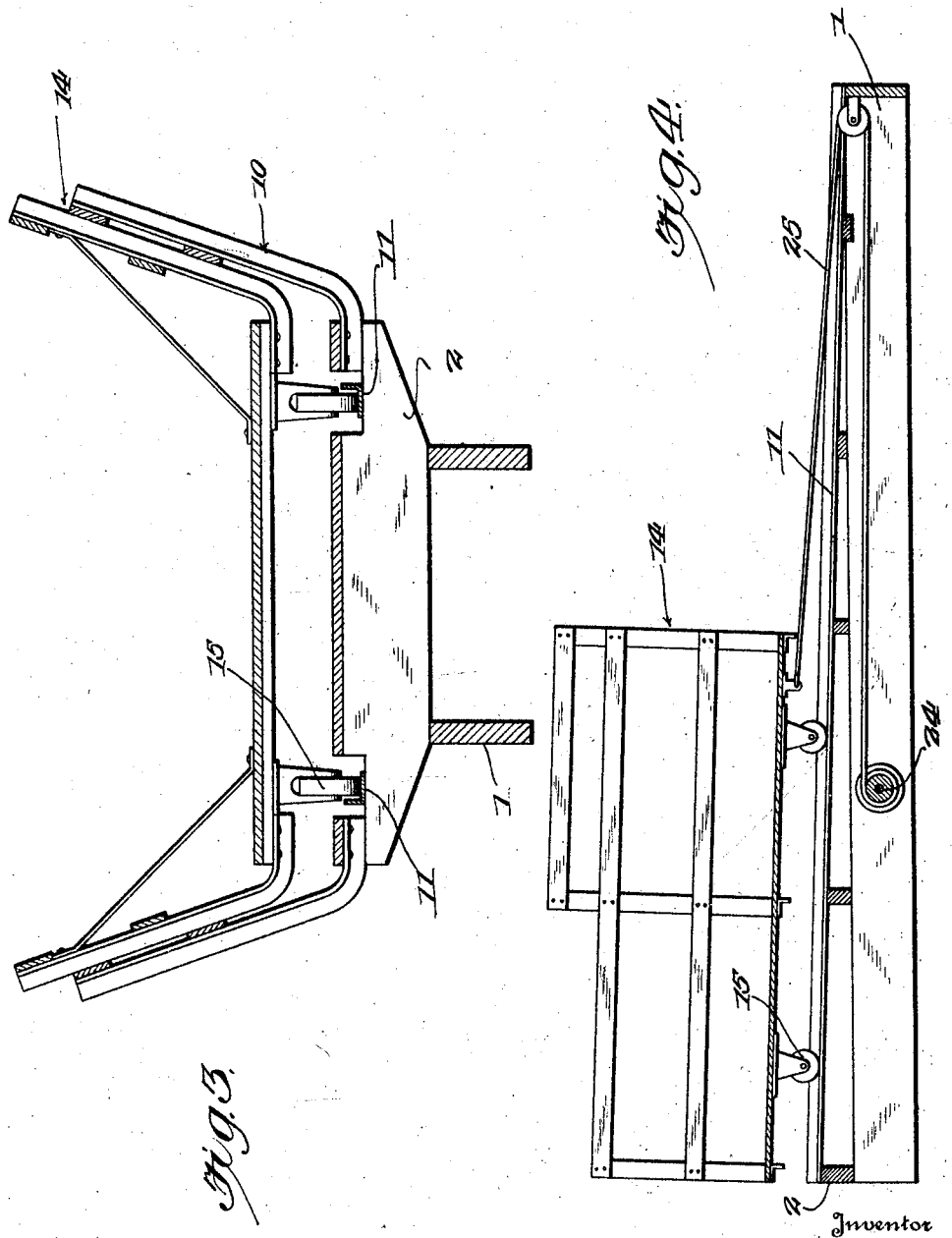

1,530,124

UNITED STATES PATENT OFFICE.

HERBERT KAUTZ, OF GENEVA, ILLINOIS.

AUTOMATIC HAY-LOAD ACCUMULATOR.

Application filed November 10, 1923. Serial No. 674,061.

*To all whom it may concern:*

Be it known that I, HERBERT KAUTZ, a citizen of the United States, residing at Geneva, in the county of Kane and State of Illinois, have invented certain new and useful Improvements in Automatic Hay-Load Accumulators, of which the following is a specification.

This invention relates to one man hay loaders or automatic hay load accumulators and it consists in the novel features hereinafter described and claimed.

An object of the invention is to provide a hay accumulator adapted to be drawn over a field and to which a hay loader may be attached. The hay loader gathers the cut hay from the surface of the ground and elevates the same and casts it into the accumulator. The hay loader is of usual form and is no part of the present invention which consists in the novel features of the accumulating apparatus.

The accumulator comprises a frame mounted upon wheels and adapted to be drawn by draft animals or a tractor as desired. A fixed body section is mounted at the rear portion of the frame. An apron section is mounted upon wheels and is adapted to nest in the fixed body section and may move in a forward direction with relation thereto as the hay is being accumulated. Inclined angle iron tracks are provided for the wheels of the apron section to travel upon.

At the beginning of the operation of accumulating the hay it is deposited in the apron section and the said section is moved forwardly by stages and by means which is provided for accomplishing such movement, and the fixed body section is gradually uncovered whereby at the final stages of the accumulation of the hay it is deposited by the loader in both the fixed body section and the apron section.

The invention further consists in novel means for moving the apron section which means is operated from one of the rear wheels of the accumulator. The said means is provided with a lever which is adapted to extend into the path of movement of the apron section and which when encountered and swung forwardly by the apron section disconnects the operating means from the rear wheel of the accumulator. Means are also provided for engaging the apron section and holding the same at the forward position when the forward movement is finished.

A winding drum with cable arranged to wind thereon is provided and suitable rigging is provided for operatively connecting the said drum at the predetermined intervals with the apron moving mechanism whereby the parts and features cooperate in prescribed and intended sequences and relation.

In the accompanying drawings—

Figure 1 is a side elevation of the hay accumulator.

Figure 2 is a top plan view of the same.

Figure 3 is a transverse sectional view of the same.

Figure 4 is a detailed view of the forward section of the hay accumulator.

The frame of the hay accumulator is composed of sills 1 having cross pieces 2 mounted thereon. Axles 3 are mounted transversely under the sills and ground wheels 4 are journaled at the ends of the axles in a usual manner. A draft means 5 is carried at the forward portion of the frame and a coupling 6 is connected with the rear portion of the frame and to which the hay loader may be connected. A body section 10 is mounted upon the rear portion of the frame and extends from the rear end of the frame to a point about midway between the ends thereof. Inclined angle iron tracks 11 extend from the rear end of the frame to the forward end thereof and are inclined forwardly and downwardly with a fall of about 5 inches throughout their lengths. A driver's platform 12 and a folding ladder 13 are mounted at the forward end of the frame and are of usual form and arrangement. An apron section 14 is mounted upon wheels 15 and the said wheels are arranged to travel upon the said track rails. The apron section may nest in the body section and may move in a forward direction until it encounters the supports of the driver's platform and the said ladder. When in its forward position the apron section uncovers the rear body section of the hay accumulator.

A sprocket wheel 20 is attached to the inner side of one of the rear wheels of the accumulator. A sprocket chain 21 is arranged for orbital movement above the said sprocket wheel. The chain is trained around a sprocket pinion 22 journaled upon one of the sills and the forward portion of the chain is trained around a pinion 23 which is mounted upon a shaft 23 disposed transversely of the frame of the hay accumulator. A drum 24 is mounted upon the said shaft and one end portion of a cable 25 is arranged to wind upon said drum. The intermediate portion of the cable is trained around a pulley attached to the forward portion of the frame and the upper rear end of the cable is attached to the forward end of the apron section 14. The chain 21 is loosely mounted upon its supporting pinions and the lower run of the chain may be moved into and out of engagement with the teeth of the sprocket wheel 20 as will be explained.

A lever 30 is fulcrumed at the forward portion of the frame and its upper free end portion is located in the path of movement of the apron section. A rod 31 is pivotally connected at its forward end with the lever at a point above the centers of the forward wheels and the rear end of the said rod is pivotally connected with a sleeve 32 which is slidably mounted upon a lever 33. The lever 33 is pivoted to a bracket 34 which is attached to and which depends from one of the sills of the frame. A roller 34 is journaled at the rear end of the lever 33 and bears against the under side of the lower run of the sprocket chain 21. A link 35 is pivoted upon the shaft of the roller 34 and is pivoted at its upper end to a shaft 36 which is carried by a link 37. The forward end of the link 37 is pivoted to the sleeve 32 and a roller 38 is journaled upon the shaft 36 and bears upon the upper side of the lower run of the sprocket chain 21.

When the apron section is nested in the fixed body section the lever 30 is swung rearwardly and the cable is unwound from the drum. When the lever 30 is swung rearwardly the rod at the lower end thereof is moved forwardly and hence the sleeve 32 is moved along the lever 33 and the said lever is swung downwardly whereby the lower run of the sprocket chain 21 is moved into contact with the teeth at the upper side of the sprocket wheel 20. Therefore as the accumulator and the loader move over the ground the hay is elevated by the elevator and is deposited into the apron section. Upon further advancement the cable is wound upon the drum and the apron section is drawn forwardly and the hay continues to be deposited in both sections. When the forward end of the apron section strikes the upper end of the lever 30 the said lever is swung forwardly and the rod is moved rearwardly whereby the lever 33 is swung upwardly and the lower run of the sprocket chain is lifted out of engagement with the teeth of the sprocket wheel 20. Thus the apron section comes to a state of rest at the forward portion of the frame but the loading of both sections may continue.

A link 40 is pivotally attached at its lower end to the intermediate portion of the rod 31 and is pivotally connected at its upper end to the intermediate portion of a prop 41 which is pivotally attached to one of the sills of the frame. Therefore when the rod is moved rearwardly the said prop is swung upwardly and engages under the rear portion of the apron and holds the same against rearward movement until such time as the rod is moved forwardly and the said prop is swung down from under the apron section.

Having described the invention what is claimed is—

1. A hay accumulator comprising a wheel mounted frame, a body section fixed upon the rear portion thereof, tracks disposed longitudinally of the frame, a wheel mounted apron section arranged to travel upon the rails and adapted to nest in the fixed section, a lever having an end portion adapted to lie in the path of movement of the apron section, a rod pivoted to the lever, a second lever pivoted to the frame and having a sleeve slidable thereon, said rod being pivoted to the sleeve, a roller carried by the sleeve, a link pivoted to the shaft of said roller, a link pivoted to the sleeve and having a shaft with a roller pivoted upon the said shaft, a link pivoted to the shafts of both rollers, a chain mounted for orbital movement above the rear wheel, a sprocket wheel mounted upon the rear wheel of the accumulator and lying below the lower run of said chain, the chain adapted to engage the sprocket wheel when the lever is swung rearwardly, a drum mounted upon the shaft of one of the sprocket wheels and a cable connected with the apron section and trained around a pulley at its intermediate portion and having an end portion adapted to wind upon the drum.

2. A hay accumulator comprising a wheel mounted frame, a body section fixed upon the rear portion thereof, tracks disposed longitudinally of the frame, a wheel mounted apron section arranged to travel upon the rails and adapted to nest in the fixed section, a lever having an end portion adapted to lie in the path of movement of the apron section, a rod pivoted to the lever, a second lever pivoted to the frame and having a sleeve slidable thereon, said rod being pivoted to the sleeve, a roller carried by the sleeve, a link pivoted to the shaft of said roller, a link pivoted to the sleeve and having a shaft with a roller journaled upon said shaft, a link pivoted to the shafts of both rollers, a chain mounted for orbital movement above the rear wheel, a sprocket wheel mounted upon the rear wheel of the accumulator and lying below the lower run of said chain, the chain adapted to engage the sprocket wheel when the lever is swung rearwardly, a drum mounted upon the shaft of one of the sprocket wheels, a cable connected with the apron section and trained around a pulley at its intermediate portion and having a portion adapted to wind upon the drum and a prop pivoted to the frame and a link pivoted to the prop and the rod whereby the prop is moved under the apron section when the lever is swung forwardly by the apron section.

In testimony whereof I affix my signature.

HERBERT KAUTZ.